United States Patent
Teicher

(10) Patent No.: US 6,922,734 B2
(45) Date of Patent: Jul. 26, 2005

(54) NON-VOLATILE STORAGE DEVICE WITH CONTACTLESS INTERFACE

(75) Inventor: Mordechai Teicher, Hod-Hasharon (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 77 days.

(21) Appl. No.: 10/627,694

(22) Filed: Jul. 28, 2003

(65) Prior Publication Data

US 2004/0236899 A1 Nov. 25, 2004

Related U.S. Application Data

(60) Provisional application No. 60/473,560, filed on May 25, 2003.

(51) Int. Cl.[7] .................................................. G06F 3/00
(52) U.S. Cl. ........................ 710/1; 710/72; 710/73; 710/74; 711/102; 711/103
(58) Field of Search ................................ 710/1, 72–74; 711/101–103

(56) References Cited

U.S. PATENT DOCUMENTS 6,405,278 B1 * 6/2002 Liepe .......................... 711/103
6,525,410 B1 * 2/2003 Gelsomini et al. ........... 257/678
6,667,906 B2 * 12/2003 Park et al. ............... 365/185.18
6,704,608 B1 * 3/2004 Azuma ........................ 700/66

* cited by examiner

Primary Examiner—Jeffrey Gaffin
Assistant Examiner—Mike Nguyen
(74) Attorney, Agent, or Firm—Mark N. Friedman

(57) ABSTRACT

An integrated storage device, for storing a data package received wirelessly from a remote base station, includes a secondary non-volatile storage device, an antenna, a primary non-volatile storage medium, and a processor. The antenna is configured to receive the data package wirelessly from the remote base station. The antenna is also configured to receive electrical energy from the remote base station in order to power the secondary non-volatile storage device, such that, the secondary non-volatile storage device is accessible in order to store the data package. The primary non-volatile storage medium is only accessible when electrically connected to a power supply. The secondary non-volatile storage device and the primary non-volatile storage medium are permanently operationally connected. The processor is configured to copy the data package from the secondary non-volatile storage device to the primary non-volatile storage medium when the primary non-volatile storage medium is electrically connected to the power supply.

12 Claims, 4 Drawing Sheets

NON-VOLATILE STORAGE DEVICE WITH CONTACTLESS INTERFACE

This application claims priority from U.S. Provisional Application No. 60/473,560 filed on May 25, 2003.

FIELD AND BACKGROUND OF THE INVENTION

The present invention relates to storage media and, in particular, it concerns non-volatile storage media that are accessible wirelessly.

By way of introduction, non-volatile storage devices are widely used in a wide variety of applications. Non-volatile storage devices include all read-write digital storage devices that retain their content when power is disconnected. Non-volatile storage devices include magnetic disks, writable optical disks, and non-volatile solid-state devices such as flash disks. From an application viewpoint, non-volatile storage devices can be categorized into three groups. The first group includes embedded storage devices, wherein the storage device is a permanent part of an electronic appliance such as a cellular telephone or a computer. The second group includes removable storage devices, wherein the storage device is easily inserted into and removed from an electronic appliance, such as, a memory card of a digital camera. The last group includes portable storage devices, wherein the storage device is a stand-alone device that can be selectively connected to appliances, for example a USB flash disk. In all three groups the non-volatile storage devices are sometimes disconnected from a power source. For example, a new cellular telephone is customarily supplied boxed with its battery disconnected from the cellular phone, a flash card of a digital camera is often removed from the camera, and a portable USB flash disk is energized only when connected to a USB port of an appliance. In all these examples, the non-volatile storage device maintains the data stored therein after power is disconnected therefrom, but the non-volatile storage device cannot be accessed to read therefrom or write thereto unless the non-volatile storage device is physically connected to a power source.

Contactless smart cards are an example of an exceptional case whereby a non-volatile memory can be accessed without the non-volatile memory being physically connected to a power source. Each contactless smart card includes a small antenna. When positioned in the proximity of a compatible base station, the antenna of the card receives sufficient electrical energy to operate the card's circuitry. The same antenna is also used to establish a wireless communication link between the contactless smart card and the base station. The wireless communication link enables the base station to read from, and in some models also write to, the smart card's non-volatile memory. This technology is applied in a variety of ways including credit-card-like plastics and key fobs. The main applications of contactless smart cards are high-speed identification and value transactions in mass transit and parking. Due to the very limited energy supply, on the one hand, and the requirement for high transaction speed, on the other hand, the amount of writable non-volatile memory in contactless smart cards is very small, with current typical memory values up to four kilobytes of EEPROM.

Thus, presently there are two types of non-volatile memories. The first type being memories with large capacities, typically in the range of Megabytes to Gigabytes. These memories require physical electrical connection for the memory to be accessed. The second type being contactless cards having small amounts of non-volatile memory, up to a few kilobytes.

There is therefore a need for a system and method for writing data onto a non-volatile memory having a large capacity when the non-volatile memory is not physically electrically connected to a power supply.

SUMMARY OF THE INVENTION

The present invention is an integrated storage device and method of operation thereof.

According to the teachings of the present invention there is provided an integrated storage device for storing a data package received wirelessly from a remote base station, comprising: (a) a primary non-volatile storage medium which is accessible when electrically connected via a wired power link to an appliance power supply of an appliance; (b) a secondary non-volatile storage device; (c) an antenna, configured to wirelessly receive from the remote base station: (i) the data package; and (ii) electrical energy for powering the secondary non-volatile storage device for storing the data package; and (d) a processor arrangement permanently operationally connected to the secondary non-volatile storage device and the primary non-volatile storage medium, the processor arrangement being configured for automatically copying the data package from the secondary non-volatile storage device to the primary non-volatile storage medium after the primary non-volatile storage medium is electrically connected to the appliance power supply.

According to a further feature of the present invention, there is also provided a housing, wherein the secondary non-volatile storage device, the primary non-volatile storage medium and the processor arrangement are disposed in the housing.

According to a further feature of the present invention, the primary non-volatile storage medium is configured to store at least one megabyte of data.

According to the teachings of the present invention there is also provided a method for storing data in an integrated storage device, the storage device including a primary non-volatile storage medium, a secondary non-volatile storage device and an antenna, the method comprising the steps of: (a) wirelessly receiving an electrical energy via the antenna; (b) powering the secondary non-volatile storage device using the electrical energy; (c) wirelessly receiving a data package from a remote base station via the antenna; (d) storing the data package in the secondary non-volatile storage device when the secondary non-volatile storage device is powered only by the electrical energy; (e) electrically connecting the primary non-volatile storage medium to an appliance power supply of an appliance via a wired power link; and (f) after the step of electrically connecting, automatically copying the data package from the secondary non-volatile storage device to the primary non-volatile storage medium using electrical power of the appliance power supply.

According to a further feature of the present invention, there is also provided the step of reading a user identification from the secondary non-volatile storage device, by the remote base station, the step of receiving the data package being contingent on verification of the user identification by the remote base station.

According to a further feature of the present invention the data package includes a transaction log item.

According to a further feature of the present invention, there is also provided the step of at least partially configuring at least one of the storage device and the appliance using the data package, when the storage device is electrically connected to the appliance power supply.

According to a further feature of the present invention, there is also provided the step of packaging the storage device, wherein the steps of receiving a data package and storing the data package are performed after the step of packaging.

According to a further feature of the present invention the data package includes a configuration data set.

According to a further feature of the present invention, there is also provided the step of operationally connecting the storage device to the appliance, wherein the appliance is a camera.

According to a further feature of the present invention, there is also provided the step of operationally connecting the storage device to the appliance, wherein the appliance is a cellular telephone.

According to a further feature of the present invention, there is also provided the step of operationally connecting the storage device to the appliance, wherein the appliance is a personal processing system.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an integrated storage device and method of operation thereof.

The principles and operation of an integrated storage device according to the present invention may be better understood with reference to the drawings and the accompanying description.

Figure 1:
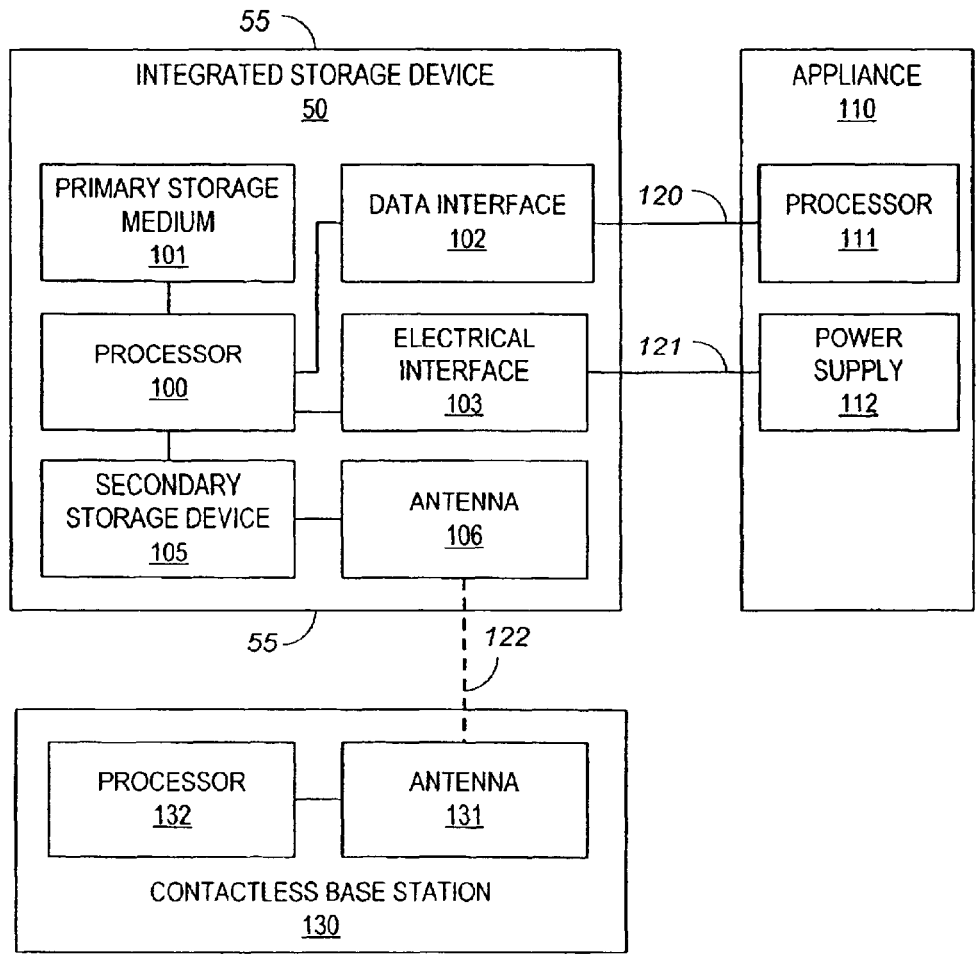
FIG. 1 is a schematic view of an integrated storage device that is constructed and operable in accordance with a preferred embodiment of the invention.

Reference is now made to FIG. 1, which is a high-level schematic block diagram of an integrated storage device 50 that is constructed and operable in accordance with a preferred embodiment of the invention. Integrated storage device 50 is configured for storing data packages received wirelessly from a remote contactless base station 130. Integrated storage device 50 includes a primary storage medium 101. Primary storage medium 101 is only accessible for writing thereto or reading therefrom when primary storage medium 101 is electrically connected to a power supply, "electrically connected" being defined herein as connected using a non-wireless link. Primary storage medium 101 is a non-volatile storage medium, such as, a magnetic disk or flash memory. Primary storage medium 101 is configured to store relatively large amounts of data, typically in the megabyte to gigabyte range. The content of primary storage medium 101 may include user files, as well as system data, such as, device identification, device configuration parameters and security functions. It will be appreciated by those skilled in the art that all or part of primary storage medium 101 can be physically, electrically and logically protected against tampering, by techniques known in the art of smart cards.

Integrated storage device 50 includes a processor arrangement 100 which controls and manages access to primary storage medium 101. If primary storage medium 101 is a flash memory, processor arrangement 100 may also be configured to manage wear leveling, error correction, and security functions. Integrated storage device 50 also includes a data interface 102 which manages data exchange with a processor 111 of an appliance 110 via a wired data link 120. Integrated storage device 50 includes an electrical interface 103 which receives electrical energy for operating processor arrangement 100 and primary storage medium 101 from a power supply 112 of appliance 110 via wired power link 121. Data link 120 and power link 121 are either permanent or temporary links. By way of a first example, when integrated storage device 50 is the memory of appliance 110, such as when appliance 110 is a cellular telephone, data link 120 and power link 121 are generally permanent. By way of a second example, when integrated storage device 50 is a USB portable storage device connectable to appliance 110, such as when 110 is a personal computer, data link 120 and power link 121 are temporary. It should be noted that data link 120 and power link 121 are typically implemented using a single physical connector, for example a USB connector. Appliance 110 is typically a personal computer, a digital camera, a music player or a cellular telephone wherein primary storage medium 101 is generally used for backup storage, picture storage, music storage or main storage, respectively.

Integrated storage device 50 also includes a secondary storage device 105 and an antenna 106. Contactless base station 130 has an antenna 131 and a processor 132. Contactless base station 130 is a contactless reader/writer. It will be appreciated by those ordinarily skilled in the art that contactless base station 130 can be configured using techniques known in the art of contactless smart cards and passive radio frequency identification (RFID) applications. Antenna 106 and antenna 131 define an electromagnetic link 122. Antenna 131 is capable of energizing secondary storage device 105 via antenna 106 as well as exchanging data with secondary storage device 105 via antenna 106. The typical operational distance between antenna 106 and antenna 131 is approximately in the range of several centimeters to a meter. Antenna 106 is configured to receive electrical energy from antenna 131 of contactless base station 130 in order to power secondary storage device 105, such that, secondary storage device 105 is accessible, for example, in order to store data. Therefore, secondary storage device 105 is accessible in order to store data thereon even when secondary storage device 105 is electrically disconnected from power supply 112. However, it will be appreciated by those skilled in the art that secondary storage device 105 is still accessible when secondary storage device 105 is electrically connected to power supply 112. Additionally, antenna 106 is configured to receive one or more data packages wirelessly from processor 132 of contactless base station 130. Similarly, data is sent from second secondary storage device 105 to processor 132 via electromagnetic link 122. Therefore, electromagnetic link 122 couples antenna 106 and antenna 131 to provide electrical energy to secondary storage device 105 as well as to allow data exchange between processor 132 and secondary storage device 105. Secondary storage device 105 typically includes a small non-volatile memory and a controller (not shown). It will be apparent to those ordinarily skilled in the art that secondary storage device 105 and antenna 106 can be configured using techniques known in the art of contactless smart cards. The memory of secondary storage device 105 is preferably a low-power EEPROM, that is either physically separated from or integrated with primary storage medium 101. In accordance with a most preferred embodiment of the present invention, secondary storage device 105 includes non-storage functions performed by the controller of secondary storage device 105, such as, contactless identification, authentication and payment. These non-storage functions are known in the art of contactless smart cards.

Processor arrangement 100 is also configured to copy data packages from secondary storage device 105 to primary storage medium 101 when primary storage medium 101 is electrically connected to a power supply. The term "copy" is defined herein to include, optionally, either leaving the copied data on secondary storage device 105 or deleting the copied data from secondary storage device 105.

Integrated storage device 50 includes a housing 55. Primary storage medium 101, secondary storage device 105 and processor arrangement 100 are disposed in housing 55. Primary storage medium 101, secondary storage device 105 and processor arrangement 100 are permanently operationally connected, such that, the connection between primary storage medium 101, secondary storage device 105 and processor arrangement 100 is not reversed during normal use of integrated storage device 50. For example, primary storage medium 101, secondary storage device 105 and processor arrangement 100 cannot be conveniently disconnected from each other without using tools.

Reference is now made to FIGS. 2a to 2d which describe various usage scenarios of integrated storage device 50.

Figure 2A:
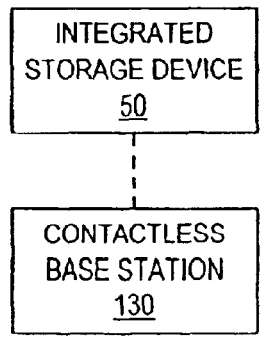
FIG. 2a is a schematic view of the integrated storage device of FIG. 1 which is in wireless contact with a contactless base station.

Reference is now made to FIG. 2a, which is a schematic view of integrated storage device 50 which is in wireless contact with contactless base station 130. Integrated storage device 50 is in proximity with contactless base station 130. Integrated storage device 50 and contactless base station 130 are electromagnetically coupled. Therefore, processor 132 (FIG. 1) is able to write data onto secondary storage device 105 (FIG. 1). Primary storage medium 101 is inaccessible since primary storage medium 101 is not electrically connected to a power supply, such as power supply 112 of appliance 110.

Figure 2B:
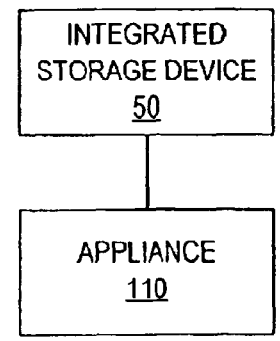
FIG. 2b is a high-level block diagram of the integrated storage device of FIG. 1 which is electrically connected to an appliance.
Figure 2C:
FIG. 2c is a schematic view of the integrated storage device of FIG. 1 which is not connected to any other device or appliance.

Reference is now made to FIG. 2b, which is a schematic view of integrated storage device 50 which is electrically connected to appliance 110. Power supply 112 (FIG. 1) of appliance 110 energizes processor arrangement 100 (FIG. 1) and primary storage medium 101 (FIG. 1) enabling copying of data from secondary storage device 105 (FIG. 1) to primary storage medium 101. It should be noted that integrated storage device 50 is generally configured so that copying of data from secondary storage device 105 to primary storage medium 101 is triggered automatically when integrated storage device 50 is electrically connected to power supply 112. It will be appreciated by those ordinarily skilled in the art that other transactions between processor arrangement 111 and primary storage medium 101 are also enabled. These other transactions are conventional and beyond the scope of the present invention Reference is also made to FIG. 2c, which is a schematic view of integrated storage device 50 which is not connected to any other device or appliance. In this scenario, integrated storage device 50 is disconnected from other devices. Therefore, the data stored in primary storage medium 101 (FIG. 1) and secondary storage device 105 (FIG. 1) cannot be read or changed.

Figure 2D:
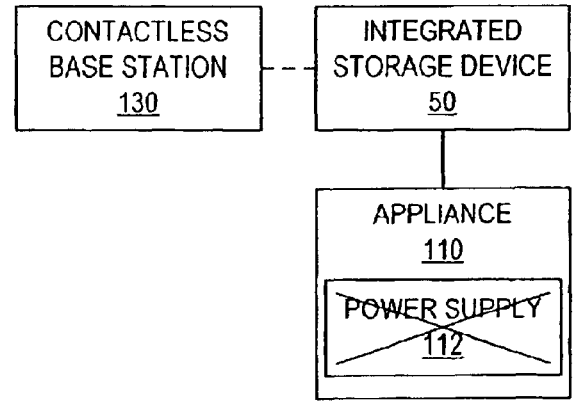
FIG. 2d is a schematic view of the integrated storage device of FIG. 1 which is in wireless contact with the remote contactless base station, the integrated storage device also being electrically connected to an appliance, the appliance not being connected to a power supply.

Reference is now made to FIG. 2d, which is a schematic view of integrated storage device 50 which is in wireless contact with contactless base station 130. In this scenario, integrated storage device 50 is also electrically connected to appliance 110. However, power supply 112 of appliance 110 is disconnected or not active. Therefore, the connection between appliance 110 and integrated storage device 50 is ineffective. Therefore, the scenario of this figure is functionally identical with the scenario of FIG. 2a. A realistic example of the scenario of this figure is a new cellular telephone that is still packaged within a box, with the battery of the cellular phone disconnected from the cellular phone. The present invention then allows some parameters, for example, operator identity, user name, telephone number and other credentials, to be updated in a secondary storage device of an integrated storage device of the telephone without opening the package, and only later, when the box is opened and the battery is connected to the telephone, the processor of the integrated storage device automatically copies the parameters from the secondary storage device to a primary storage device of the integrated storage device.

Figure 3:
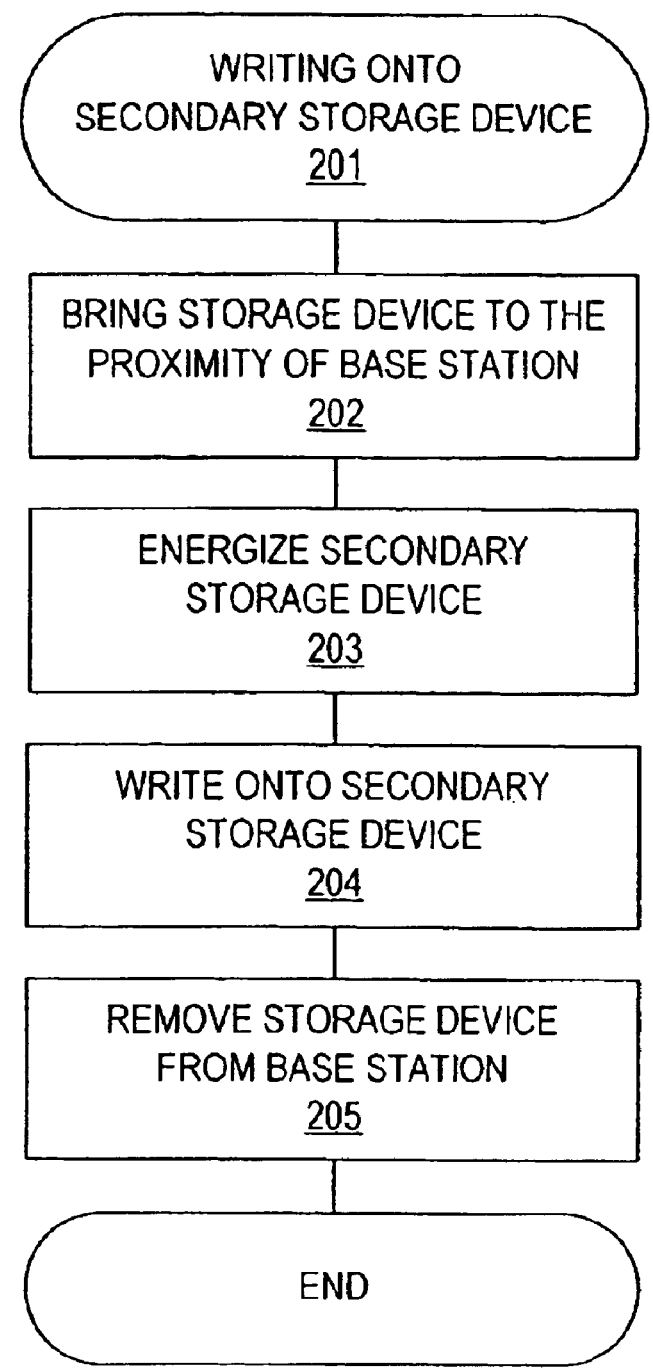
FIG. 3 is a flow chart of the steps of a method for writing to a secondary storage device of the integrated storage device of FIG. 1.
Figure 4:
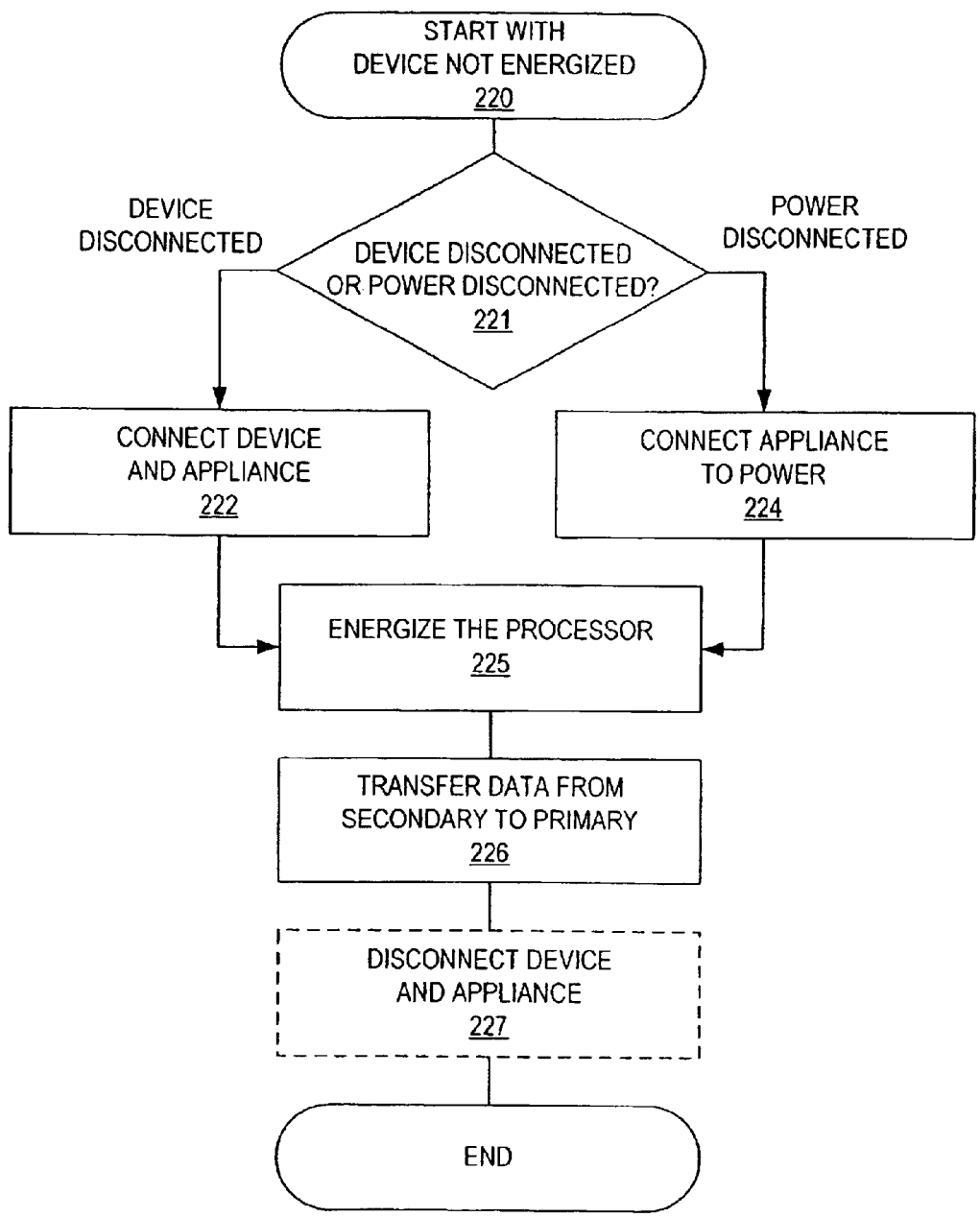
FIG. 4 is a flow chart of the steps of a method for copying data to the primary storage device of the integrated storage device of FIG. 1.

Reference is now made to FIGS. 3 and 4, which describe the operation of integrated storage device 50.

Reference is now made to FIG. 3, which is a flow chart of the steps of a method for writing to secondary storage device 105 of integrated storage device 50 of FIG. 1. Reference is also made to FIG. 1. First, a decision is made to update the content of integrated storage device 50 (block 201). Second, integrated storage device 50 is brought into the proximity of contactless base station 130, to enable electromagnetic coupling between antenna 106 and antenna 131 so that electrical energy is received via antenna 106 (block 202). If integrated storage device 50 is packaged within a non-metallic box, removal from the box may be unnecessary since electromagnetic coupling can penetrate such packaging. Third, secondary storage device 105 is powered using the electrical energy received via antenna 106 (block 203). Fourth, integrated storage device 50 receives data packages from processor 132 of contactless base station 130 via antenna 106. The data packages are then stored in secondary storage device 105 (block 204). At this point, secondary storage device 105 is generally only powered by the electrical energy received via antenna 106 from contactless base station 130. Finally, integrated storage device 50 is removed from the proximity of contactless base station 130, thus disabling further communication between the two devices (block 205).

Reference is now made to FIG. 4, which is a flow chart of the steps of a method for copying data from secondary storage device 105 to primary storage medium 101. Reference is also made to FIG. 1. Initially, the integrated storage device 50 is not energized (block 220) either because integrated storage device 50 is disconnected from appliance 110, or power supply 112 is disconnected from appliance 110. First, the connection status of integrated storage device 50 and appliance 110 is examined (block 221). By way of a first example, integrated storage device 50 and appliance 110 are typically operationally connected prior to this step when appliance 110 is a cellular telephone. By way of a second example, integrated storage device 50 and appliance 110 are sometimes operationally disconnected prior to this step when appliance 110 is a camera or personal processing system. A personal processing system is defined as a processor with a user interface having a keyboard and display device, for example, a personal computer system or a personal digital assistant (PDA). If integrated storage device 50 and appliance 110 are not connected then integrated storage device 50 is operationally connected to appliance 110 (block 222). If appliance 110 and power supply 112 are not connected then appliance 110 is connected to power supply 112 (Block 224) The scenario where integrated storage device 50, appliance 110 and power supply 112 are all disconnected from each other is not common and has therefore not been described. However, it will be apparent to those skilled in the art that integrated storage device 50, appliance 110 and power supply 112 would simply be connected together in such a scenario by performing both the step of block 222 and the step of block 224. The steps of blocks 222 and 224 electrically connect integrated storage device 50 and power supply 112 via power link 121, thereby energizing primary storage medium 101, processor arrangement 100 and secondary storage device 105 (block 225). Next, processor arrangement 100 reads the data packages previously written to secondary storage device 105. Processor arrangement 100 writes these data packages to primary storage medium 101. Therefore, processor arrangement 100 copies the data packages from secondary storage device 105 to primary storage medium 101 (block 226). Finally, in an optional step, integrated storage device 50 is disconnected from appliance 110. However, integrated storage device 50 and appliance 110 may remain operationally connected to enable continued transactions between processor 111 and primary storage 101, which are beyond the scope of the present invention.

Examples of applications of the present invention are described below.

The present invention lends itself to in-box setup. Often a storage device or a digital appliance requires customization and personalization after leaving the factory but before being operated by the end user of the device or appliance. The teachings of the present invention are applied as follows. First integrated storage device 50, possibly together with appliance 110, is packaged in a box. Second, data packages containing a configuration data set are sent from contactless base station 130 which is outside the box. The data packages are received by antenna 106. The data packages are then written to and stored in secondary storage device 105. When integrated storage device 50 is unboxed and electrically connected to a power supply by a user, the data packages are copied from secondary storage device 105 to primary storage medium 101 by processor arrangement 100, such that, integrated storage device 50 and/or appliance 110 are configured using the configuration data set.

By way of a first example, an institution equips each of its employees with a personal portable storage device, integrated storage device 50. Each integrated storage device 50 is configured, while still in its box, with the institution name and website address, employee name, access passwords and special credentials. All these configuration details are written temporarily, by applying the present invention, to secondary storage device 105 of integrated storage device 50 without opening the box. Integrated storage device 50 is configured permanently the first time that integrated storage device 50 is inserted into a personal computer 110 by the employee.

By way of a second example, appliance 110 is a cellular telephone, which is configured at the operator's office, without opening its box, with the credentials of the operator and the user. The configuration becomes permanent when power supply 112, which is the battery of the cellular telephone, is connected to the cellular telephone, whereby the content of secondary storage device 105 is copied to primary storage medium 101.

In-box configuration will be appreciated by end-users who prefer receiving new devices sealed in their original package. Additionally, in-box configuration is much more efficient and economical to carry out in comparison to opening each and every box and physically connecting the device.

The present invention also lends itself to transaction logging. Transaction logging is part of the process of purchasing a product or service using an electronic purchasing means. For example, the purchasing process using an electronic purchasing means is as follows. First, a remote base station, which is associated with selling a service or product, reads a user identification from secondary storage device 105. Secondary storage device 105 includes payment and/or access functions. Such functions are well known to those skilled in the art of contactless smart cards. Additionally, secondary storage device 105 also includes a log file that records transactions. Second, the remote base station verifies the user identification and buying power, for example by communicating with the user's bank as customary with regular credit card purchases. Third, the user of integrated storage device 50 purchases a service and/or a product. Fourth, a data package including a transaction log item is sent by contactless base station 130 to integrated storage device 50. The transaction log item is stored in the log file of secondary storage device 105. Due to the limited capacity of secondary storage device 105, the log-file is only capable of storing a very limited number of transactions with minimal details for each transaction. By applying the teachings of the present invention however, the full log file is maintained within primary storage device 101, based on automatic uploads from the small log file which is maintained within secondary storage device 105. The automatic uploads take place whenever integrated storage device 50 is inserted into appliance 110, for example a personal computer system or PDA, for any reason.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art which would occur to persons skilled in the art upon reading the foregoing description.

What is claimed is:

1. An integrated storage device for storing a data package received wirelessly from a remote base station, comprising:
   (a) a primary non-volatile storage medium which is accessible when electrically connected via a wired power link to an appliance power supply of an appliance;
   (b) a secondary non-volatile storage device;
   (c) an antenna, configured to wirelessly receive from the remote base station:

(i) the data package; and (ii) electrical energy for powering said secondary non-volatile storage device for storing the data package: and (d) a processor arrangement permanently operationally connected to said secondary non-volatile storage device and said primary non-volatile storage medium, said processor arrangement being configured for automatically copying the data package from said secondary non-volatile storage device to said primary non-volatile storage medium after said primary non-volatile storage medium is electrically connected to said appliance power supply.

2. The device of claim 1, further comprising:

(e) a housing, wherein said secondary non-volatile storage device, said primary non-volatile storage medium and said processor arrangement are disposed in said housing.

3. The device of claim 1, wherein said primary non-volatile storage medium is configured to store at least one megabyte of data.

4. A method for storing data in an integrated storage device, the storage device including a primary non-volatile storage medium, a secondary non-volatile storage device and an antenna, the method comprising the steps of:

(a) wirelessly receiving an electrical energy via the antenna;

(b) powering the secondary non-volatile storage device using said electrical energy;

(c) wirelessly receiving a data package from a remote base station via the antenna;

(d) storing said data package in the secondary non-volatile storage device when the secondary non-volatile storage device is powered only by said electrical energy;

(e) electrically connecting the primary non-volatile storage medium to an appliance power supply of an appliance via a wired power link; and (f) after said step of electrically connecting, automatically copying said data package from the secondary non-volatile storage device to the primary non-volatile storage medium using electrical power of said appliance power supply.

5. The method of claim 4, further comprising the step of:

(g) reading a user identification from the secondary non-volatile storage device, by said remote base station, said step of receiving said data package being contingent on verification of said user identification by said remote base station.

6. The method of claim 5, wherein said data package includes a transaction log item.

7. The method of claim 4, further comprising the step of:

(g) at least partially configuring at least one of the storage device and said appliance using said data package, when the storage device is electrically connected to said appliance power supply.

8. The method of claim 7, further comprising the step of:

(h) packaging the storage device, wherein said steps of receiving a data package and storing said data package are performed after said step of packaging.

9. The method of claim 4, wherein said data package includes a configuration data set.

10. The method of claim 4, further comprising the step of:

(g) operationally connecting the storage device to said appliance, wherein said appliance is a camera.

11. The method of claim 4, further comprising the step of:

(g) operationally connecting the storage device to said appliance, wherein said appliance is a cellular telephone.

12. The method of claim 4, further comprising the step of:

(g) operationally connecting the storage device to said appliance, wherein said appliance is a personal processing system.

* * * * *